(12) United States Patent
Townsley (10) Patent No.: US 7,534,011 B2
(45) Date of Patent: May 19, 2009

(54) LIGHTING APPARATUS

(75) Inventor: Evan Townsley, Culver City, CA (US)

(73) Assignee: International Growers Supply Incorporated, Culver City, CA (US)

( * ) Notice: Subject to any disclaimer, the term of this patent is extended or adjusted under 35 U.S.C. 154(b) by 0 days.

(21) Appl. No.: 11/836,060

(22) Filed: Aug. 8, 2007

(65) Prior Publication Data

US 2008/0205071 A1    Aug. 28, 2008

Related U.S. Application Data

(60) Provisional application No. 60/891,490, filed on Feb. 23, 2007.

(51) Int. Cl.
*F21V 29/00* (2006.01)
(52) U.S. Cl. .................. 362/294; 362/264; 362/373; 362/345
(58) Field of Classification Search .............. 362/294, 362/264, 373, 345
See application file for complete search history.

(56) References Cited

U.S. PATENT DOCUMENTS

| | | | | |
|---|---|---|---|---|
| 4,931,912 A | * | 6/1990 | Kawakami et al. | 362/547 |
| 5,113,320 A | * | 5/1992 | Haydu | 362/549 |
| 6,042,250 A | | 3/2000 | Stragnola | |
| 6,988,816 B2 | | 1/2006 | Witkowski | |
| 2004/0032740 A1 | * | 2/2004 | Kurashima et al. | 362/373 |

* cited by examiner

*Primary Examiner*—Laura Tso
(74) *Attorney, Agent, or Firm*—Jeffer Mangels Butler & Marmaro LLP (57) ABSTRACT

A lighting apparatus that includes an outer housing defining an intake vent and an exhaust vent, an inner housing disposed within the interior of the outer housing, and an air path defined between the outer housing and the inner housing. The outer housing includes a cover, a top and a plurality of side walls that define the interior, and the inner housing includes a top and a plurality of side walls that correspond to the top and plurality of side walls of the outer housing. The air entering the outer housing through the intake vent travels along the air path and exits the outer housing through the exhaust vent.

16 Claims, 10 Drawing Sheets

LIGHTING APPARATUS

This application claims the benefit of U.S. Provisional Application No. 60/891,490, filed Feb. 23, 2007, which is herein incorporated by reference in its entirety.

FIELD OF THE INVENTION

The present invention relates to a lighting apparatus, and more particularly to a light reflecting apparatus with an air cooling system.

BACKGROUND OF THE INVENTION

Lighting apparatuses in greenhouses are important. The higher the lumen output the better for the growing plant. Ideally, one wants to keep the light as close to the plant as possible. However, the bulbs not only emit light, they also emit heat, which can damage plants. Therefore, a delicate balance has to be struck between how close the lighting devices are placed to the plant.

To maximize light output in a particular direction from a bulb that emits light in a 360 degree manner reflectors are used. However, the more times the light hits a reflector before it gets to the plant, the larger the distance the light is traveling. This results in a lower lumen output by the time it reaches the plant.

Prior art lighting reflectors radiate a lot of heat through the glass cover. This prevents a user from placing the lighting device too close to the plants. To cut down on radiated heat, typical lighting devices are air cooled by blowing air through one side of the device, over the light and out through the other side.

SUMMARY OF THE PREFERRED EMBODIMENTS

In accordance with a first aspect of the present invention, there is provided a lighting apparatus that includes an outer housing defining an intake vent and an exhaust vent, an inner housing disposed within the interior of the outer housing, and an air path defined between the outer housing and the inner housing. The outer housing includes a cover, a top and a plurality of side walls that define the interior, and the inner housing includes a top and a plurality of side walls that correspond to the top and plurality of side walls of the outer housing. The air entering the outer housing through the intake vent travels along the air path and exits the outer housing through the exhaust vent. In a preferred embodiment, a first air path segment is defined between a first side wall of the outer housing and a corresponding first side wall of the inner housing, a second air segment is defined adjacent to the inside surface of the cover, and a third air segment is defined between a second side wall of the outer housing and a corresponding second side wall of the inner housing. The air path is comprised of the first, second and third air paths. In another preferred embodiment, the first air path segment ends in a nozzle defined by a side wall of the inner housing and three side walls of the outer housing.

In accordance with another aspect of the present invention there is provided a method of minimizing heat emanating from a lighting apparatus. The method includes the steps of providing a lighting apparatus with an outer housing having an intake vent and an exhaust vent defined therein, an inner housing, a bulb and a cover, illuminating the bulb, thereby giving off heat, and moving air through the intake vent, through a first chamber defined between the inner and outer housings, across the inside surface of the cover, through a second chamber defined between the inner and outer housings and through the exhaust vent. In a preferred embodiment, the cross-sectional area of the first chamber decreases in an air flow direction and the cross-sectional area of the second chamber increases in an air flow direction.

BRIEF DESCRIPTION OF THE DRAWINGS

Like numerals refer to like parts throughout the several views of the drawings.

DESCRIPTION OF THE PREFERRED EMBODIMENTS

As shown in the drawings, for purposes of illustration, the invention is embodied in a lighting apparatus. In a preferred embodiment, the lighting apparatus is used in an indoor greenhouse. For example, the present invention can be used in the indoor greenhouse described in U.S. application Ser. No. 11/682,803, filed Mar. 6, 2007, the entirety of which is incorporated by reference. However, this is not a limitation on the present invention.

It will be appreciated that terms such as "front," "back," "top," "bottom," "left," "right," "above," and "side" used herein are merely for ease of description and refer to the orientation of the components as shown in the figures. It should be understood that any orientation of the lighting apparatus, and the components thereof described herein, is within the scope of the present invention.

As shown in FIGS. 1-9B, generally, the lighting apparatus 10 includes an outer housing or hood 12, an inner housing or light reflector or specular insert 14, a cover 16, intake and exhaust vents 18 and 20 and a light source 21.

Figure 2:
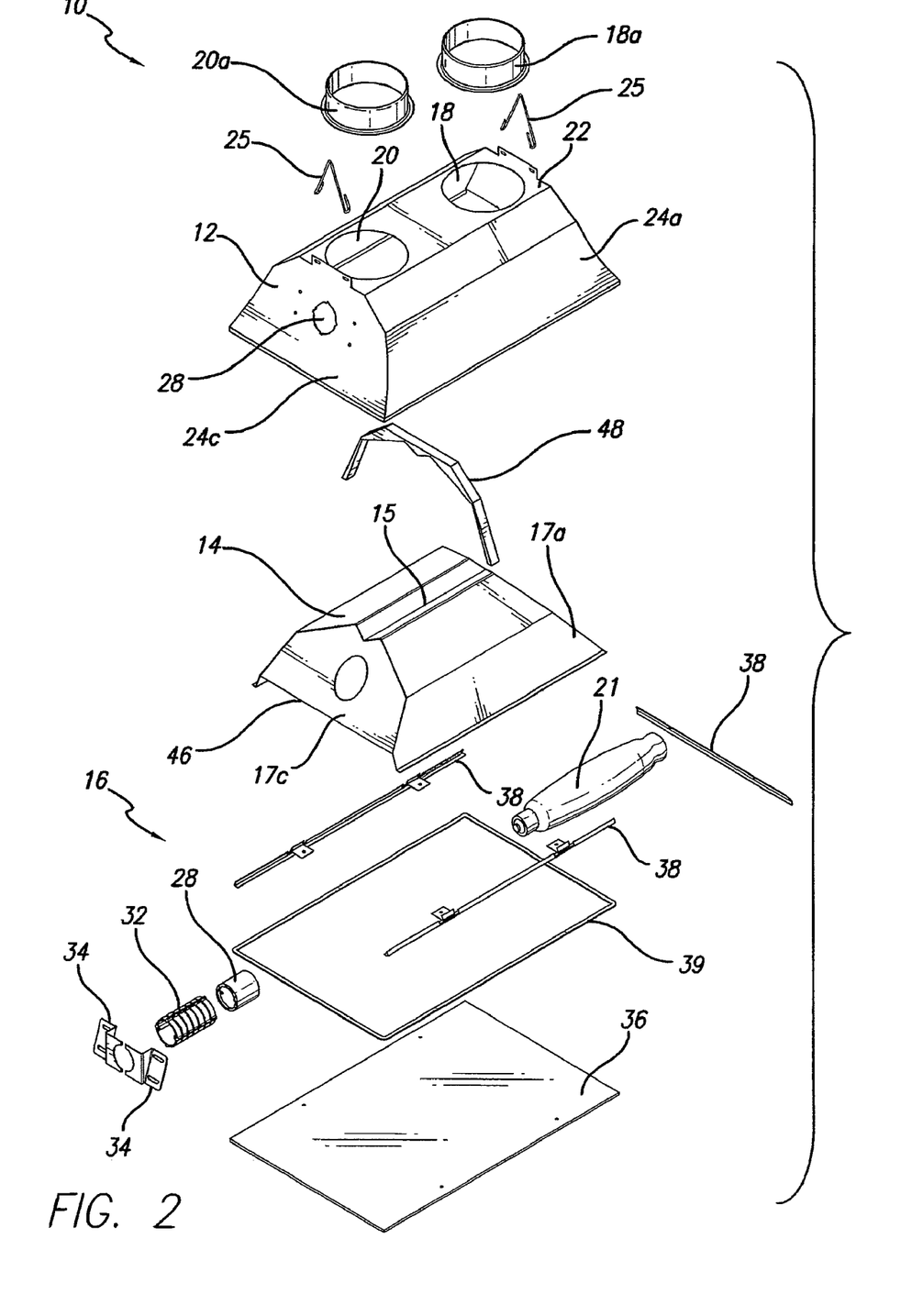
FIG. 2 is an exploded view of the lighting apparatus of FIG. 1.

As is best shown in FIG. 2, the outer housing 12 includes the cover, a top 22 and a plurality of side walls 24 (sometimes referred to herein individually as front side wall 24a, back side wall 24b, left side wall 24c and right side wall 24d) that cooperate to define an interior 26 and an open bottom that is spanned by removable cover 16. In a preferred embodiment, the side walls 24 extend generally away from top 22 at an angle.

Figure 3:
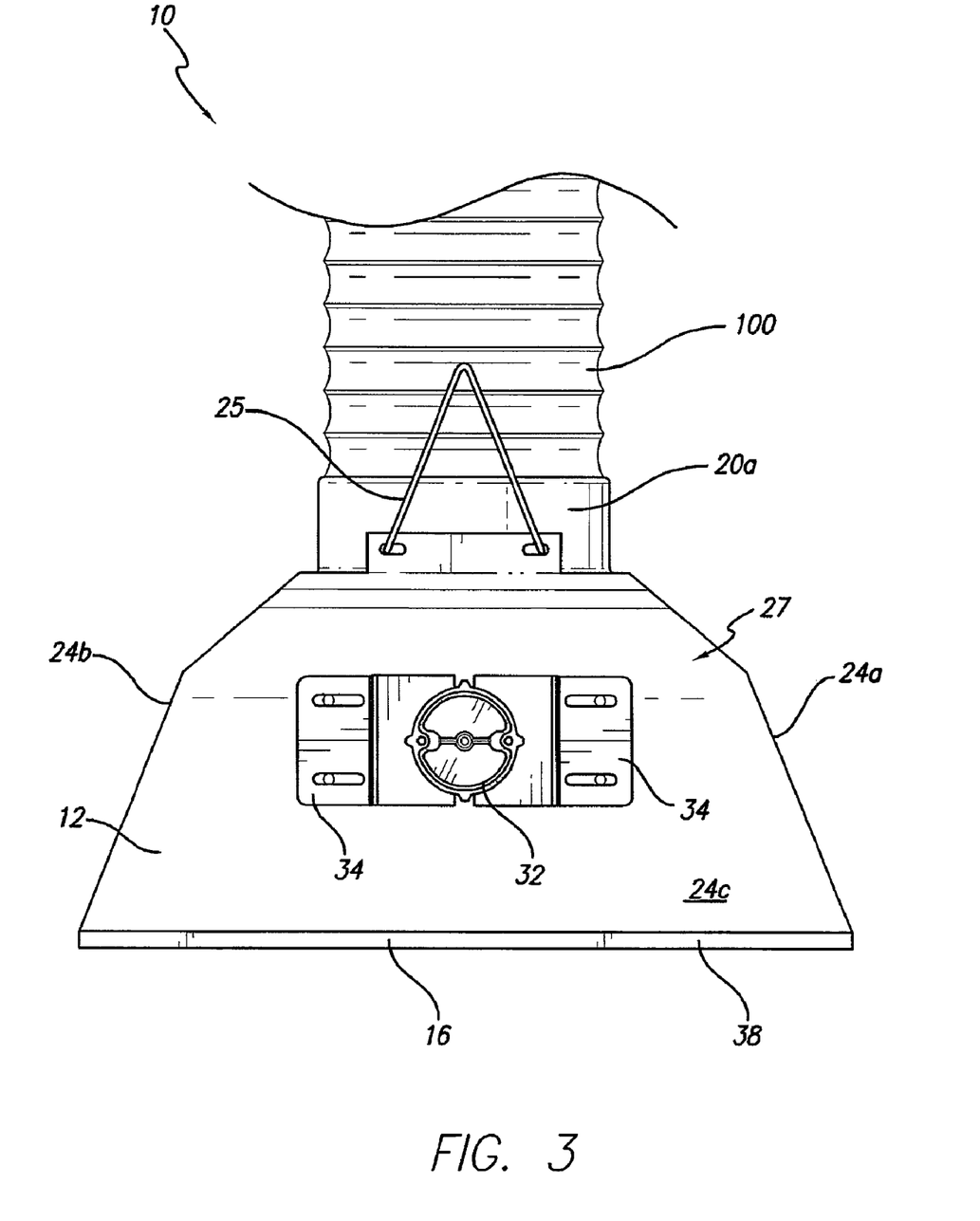
FIG. 3 is a left side elevational view of the lighting apparatus of FIG. 1.
Figure 4:
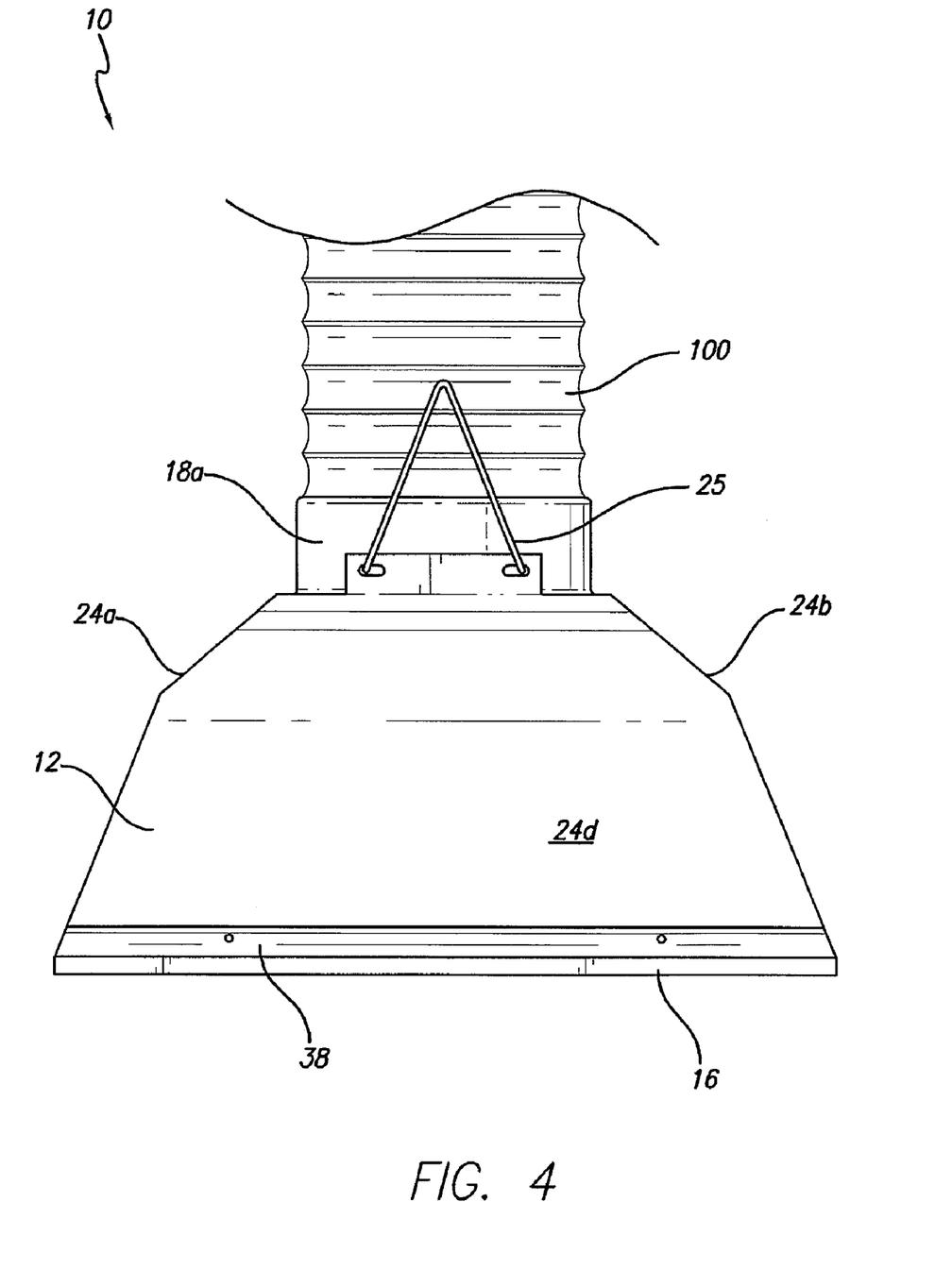
FIG. 4 is a right side elevational view of the lighting apparatus of FIG. 1.
Figure 5:
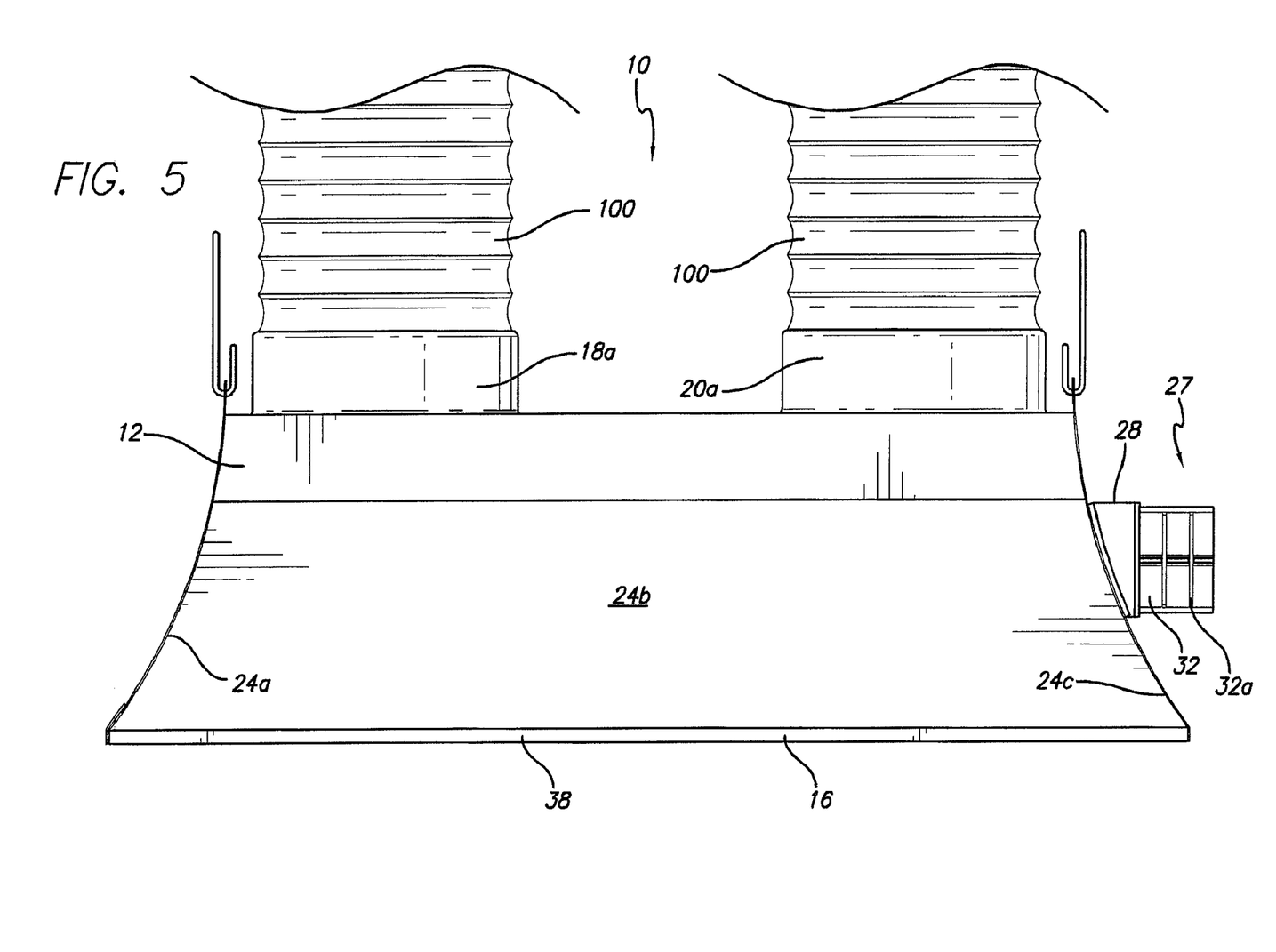
FIG. 5 is a front elevational view of the lighting apparatus of FIG. 1
Figure 6:
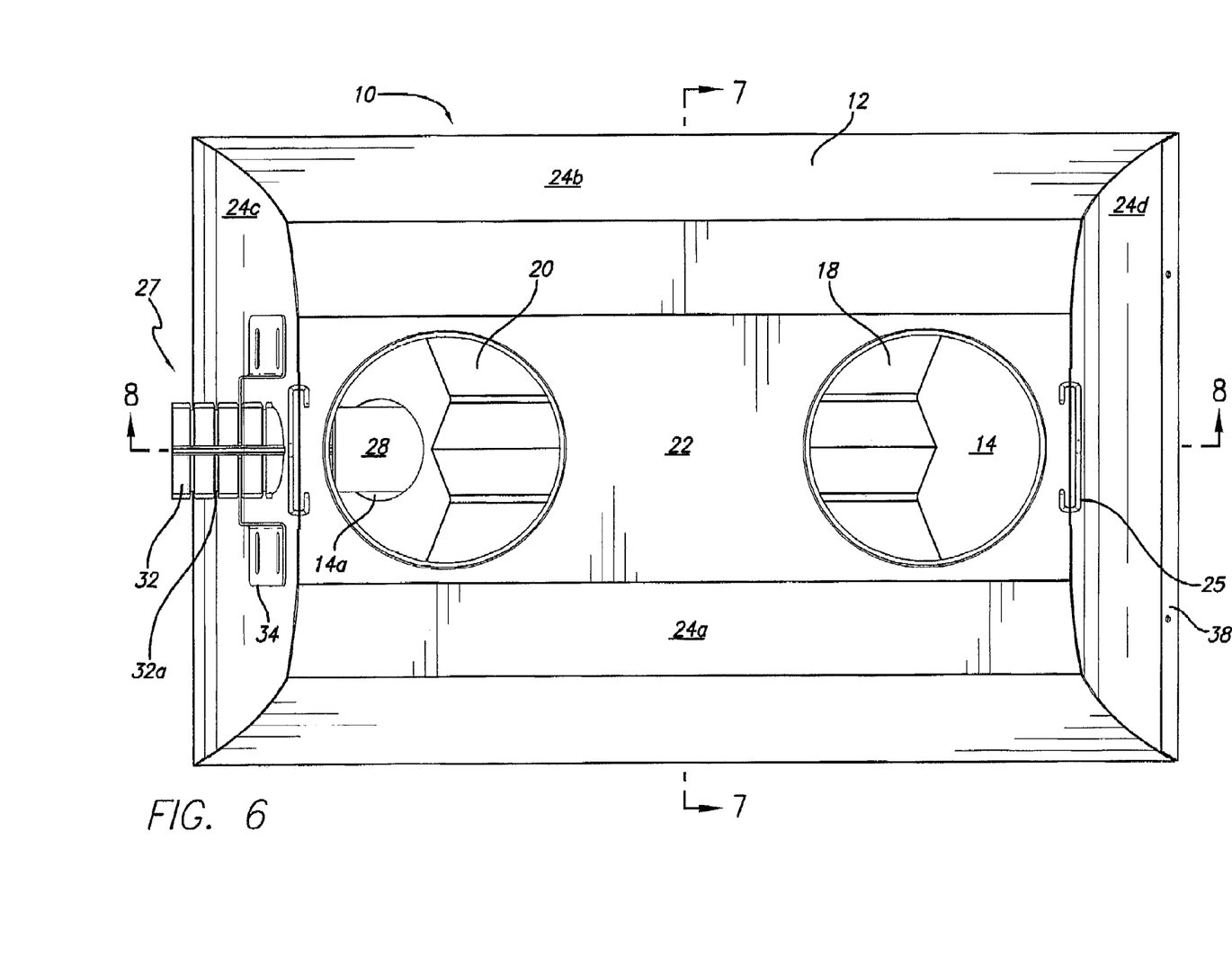
FIG. 6 is a top plan view of the lighting apparatus of FIG. 1.

As shown in FIG. 3, in a preferred embodiment, front and back side walls 24a and 24b include two generally flat portions that meet at an angle, and, as shown in FIG. 5, in a preferred embodiment, left and right side walls 24c and 24d include a slight curvature as they extend away from top 22. It will be understood that these shapes are not a limitation on the present invention. For example, front and back side walls 24a and 24b could include a curve or a curved section and/or left and right side walls 24c and 24d could include two or more generally flat portions that meet at an angle. In another embodiment, all four side walls 24 could extend from the top 22 at a right angle. (thereby forming a box shaped hood).

As shown in FIG. 2, the top 22 preferably has intake and exhaust vents 18 and 20 defined therein. In the embodiment shown in the figures, the exhaust vents 18 and 20 include duct flanges 18a and 20a secured therein that allow a duct 100 to be communicated with the intake and exhaust vents 18 and 20. Housing 12 can also include hangers 25 for hanging the lighting apparatus 10 as desired. In another embodiment, the vents 18 and 20 can be located on one of the side walls 24 of housing 12.

In a preferred embodiment, the housing 12 is made of aluminum, steel or other metal. However, this is not a limitation on the present invention. Preferably, top 22 and the plurality of side walls 24 are affixed to one another by welding or the like. However, they also can be formed as a unitary piece.

Figure 7:
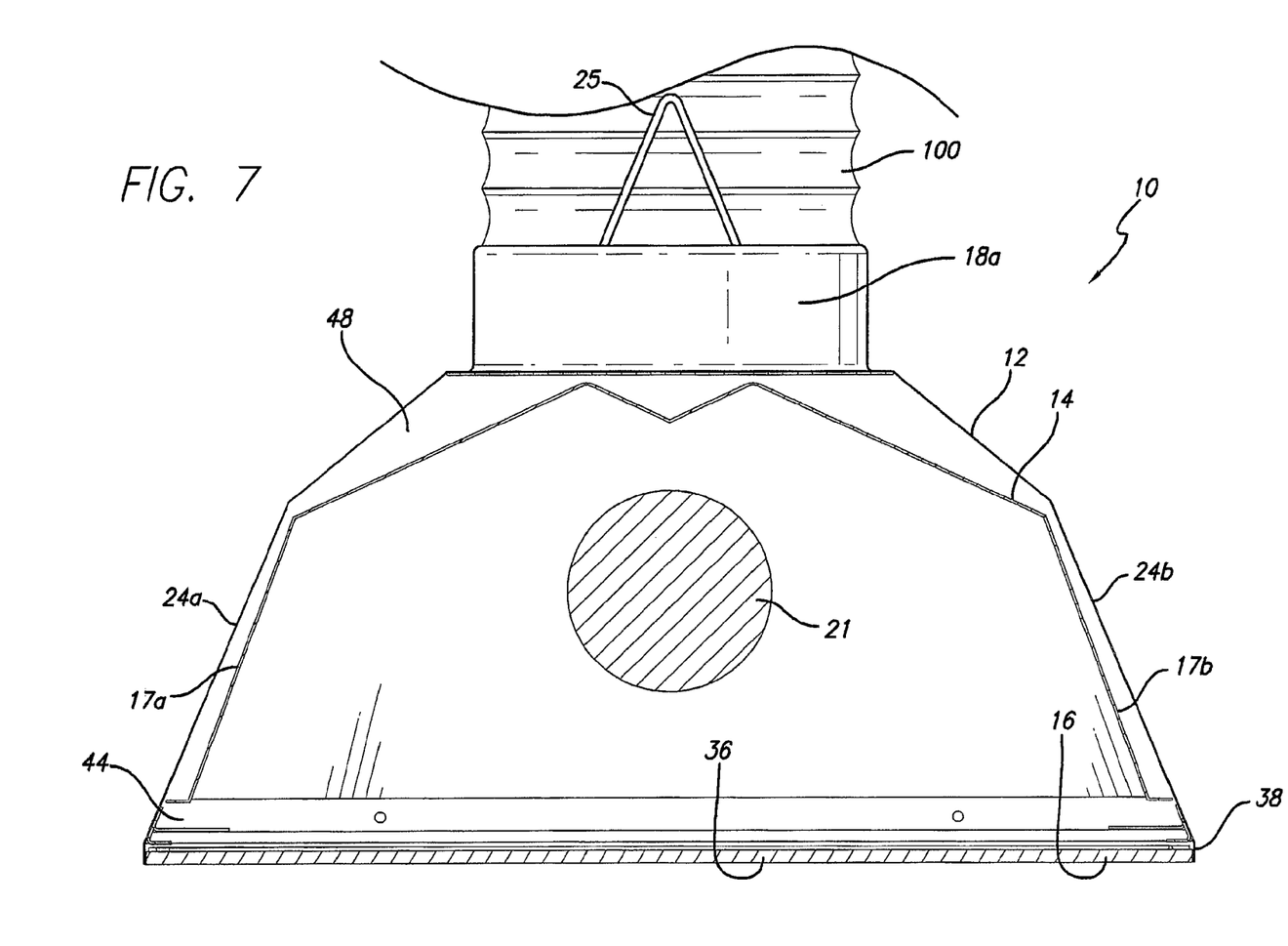
FIG. 7 is a cross sectional view of the lighting apparatus of FIG. 1 taken along line 7-7 of FIG. 6.

The reflector 14 is generally concave in shape and is comprised of a series of sections or panels that meet at angles, as is best shown in FIGS. 2 and 7. The panels and the angles at which they meet are arranged to maximize reflection of the light emitted by bulb 21 through cover 16 and to the object(s) to be lit. Reflectors or specular inserts are known in the art. For example, see U.S. Pat. No. 6,988,816 to Witkowski, which is incorporated herein in its entirety by reference. As discussed above, the angles between the different panels are dimensioned to maximize light reflection. For example, the angle of the two panels just above the bulb 21 is preferably about 130°. The type of bulb used is not a limitation on the present invention. However, in a preferred embodiment, the bulb 21 may be a high intensity discharge—metal halide or high pressure sodium bulb.

Figure 8:
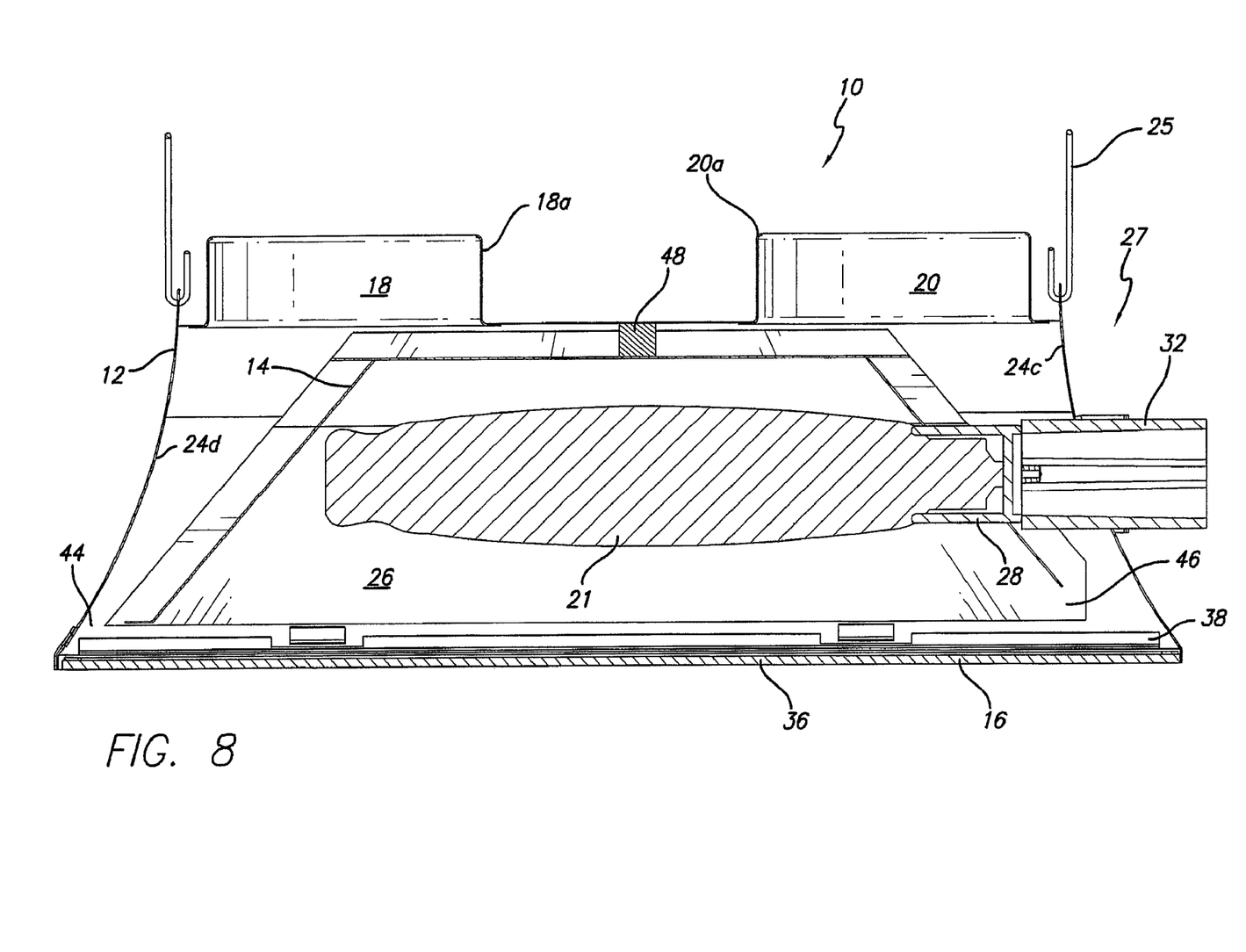
FIG. 8 is a cross sectional view of the lighting apparatus of FIG. 1 taken along line 8-8 of FIG. 6.
Figure 9:
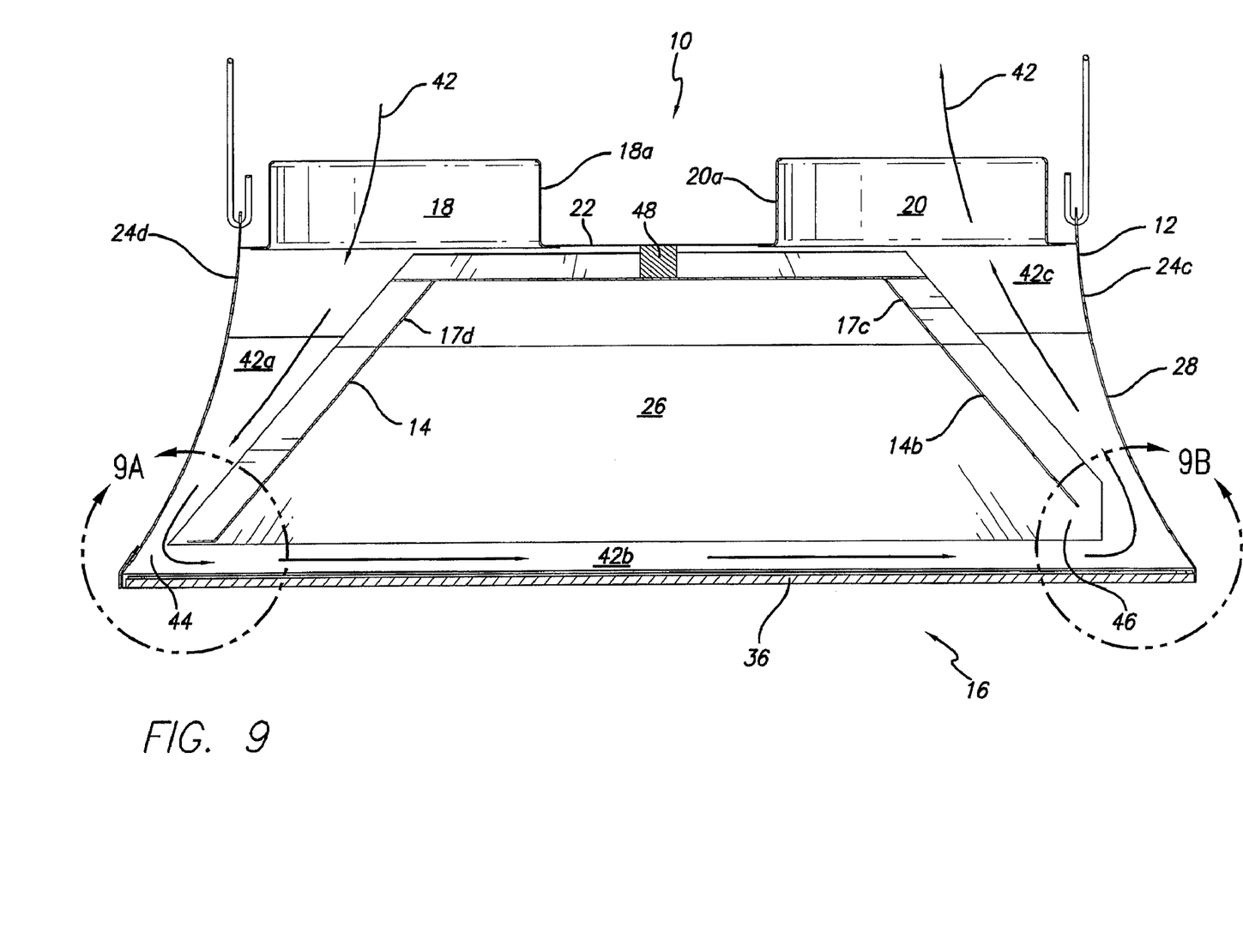
FIG. 9 is a cross sectional view of the lighting apparatus of FIG. 1 similar to FIG. 6, but with the bulb and socket assembly omitted to show the direction of air flow therethrough.

As is shown in FIGS. 2, 8 and 9, the panels of the reflector or inner housing 14 comprise a top 15 and a plurality of side walls 17 that correspond to the side walls 24 of the outer housing 12.

Figure 1:
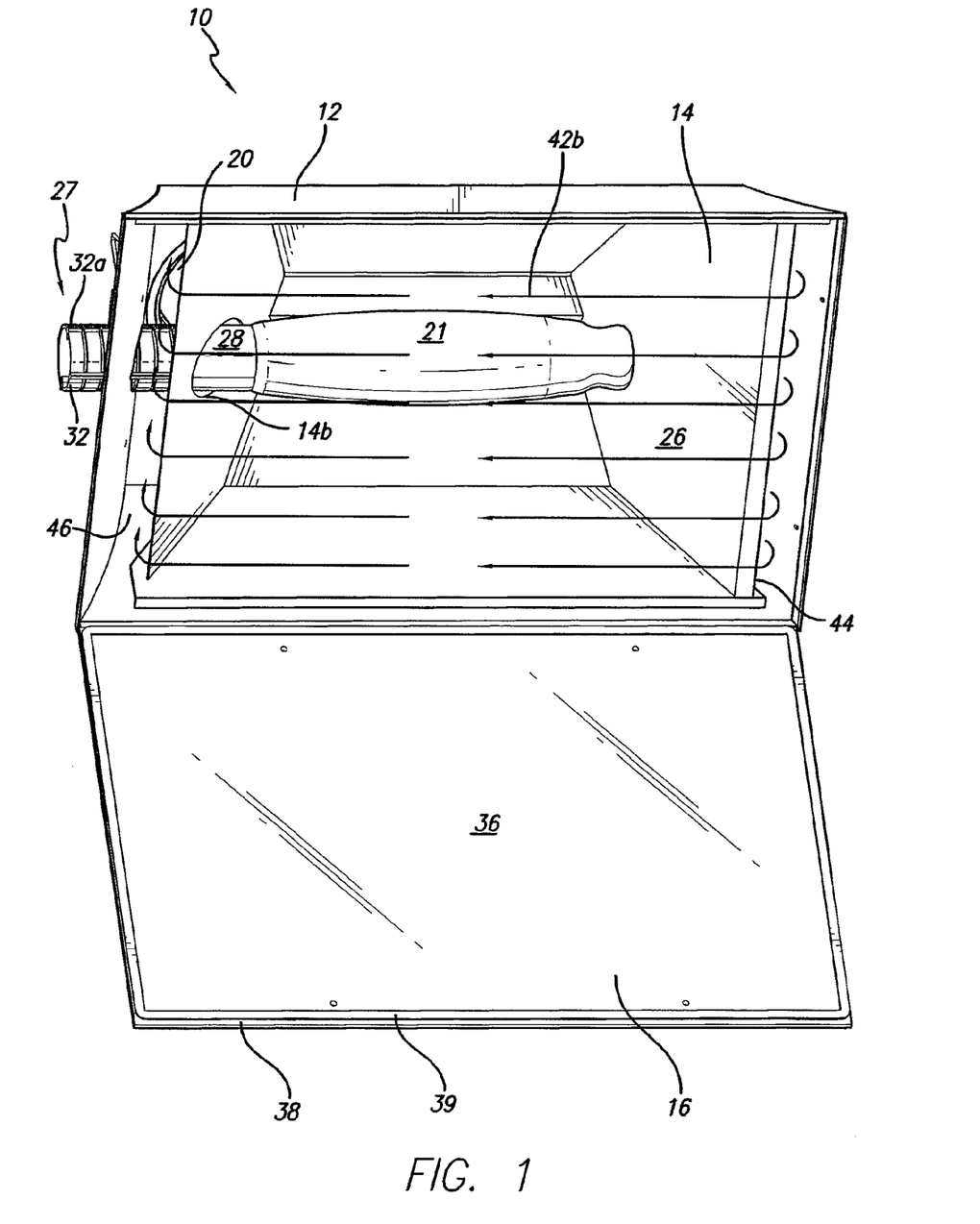
FIG. 1 is a perspective view of a lighting apparatus with the cover open in accordance with a preferred embodiment of the present invention.

As shown in FIG. 1, light source 21 (also referred to herein as bulb 21) preferably extends from a socket assembly 27. In a preferred embodiment, socket assembly 27 is mounted to the side wall 24 of housing 12 and a portion of it, including a socket 28, extends through an opening 30 in the left side wall 24a of housing 12 and bulb 21 extends through an opening 14b in one of the panels 14a and into the interior 26. It will be understood that socket 28 can be mounted on any of the side walls 24 or the top 22 of the housing.

In a preferred embodiment, the positioning of socket 28 is adjustable. In the exemplary embodiment shown in the figures, socket 28 is secured in a connector 32 that includes a plurality of grooves 32a therein that cooperate with mounting brackets 34. As shown in FIG. 3, a portion of the mounting brackets 34 is received in one of the grooves 32a, which secures the connector 32 and socket 28 in place. The mounting brackets 34 are secured to housing 12 by threaded fasteners or the like. To adjust the positioning of socket 28, the mounting brackets 34 are removed from housing 12 and are repositioned in a different groove 32a and are then resecured to housing 12. It will be readily understood by those skilled in the art that this provides axial adjustability of the positioning of socket 28 and, therefore, bulb 21.

As shown in FIG. 1, in a preferred embodiment, cover 16 is removable or pivotable away from housing 12, thereby providing access to interior 26 and bulb 21. Any cover is within the scope of the present invention. In the exemplary embodiment shown in the figures, cover 16 includes a transparent portion 36 and a frame 38 in which transparent portion 36 is secured. Frame 38 is configured to secure transparent portion 36 therein and connect cover 16 to housing 12. In a preferred embodiment, cover 16 also includes a seal 39 or seals that prevent air from escaping from between cover 16 and housing 12. In another embodiment, the seals can be water tight, thereby preventing water from getting in the lighting apparatus 10.

As shown in FIG. 9, it will be understood that the construction of lighting apparatus 10 provides an air path 42 from intake vent 18, through the space between inner reflector 14 and outer housing 12 (referred to herein as first air path segment 42a), across the inside surface of cover 16 (referred to herein as second air path segment 42b), through the space between inner reflector 14 and outer housing 12 on the opposite side (referred to herein as third air path segment 42c) and out exhaust vent 20. It will be further understood that as the air travels along this path it picks up a significant portion of the heat radiated from the bulb 21, thereby preventing it from escaping through transparent portion 36. This air flow (see the arrows in FIGS. 1 and 9) will now be described.

Figure 9A:
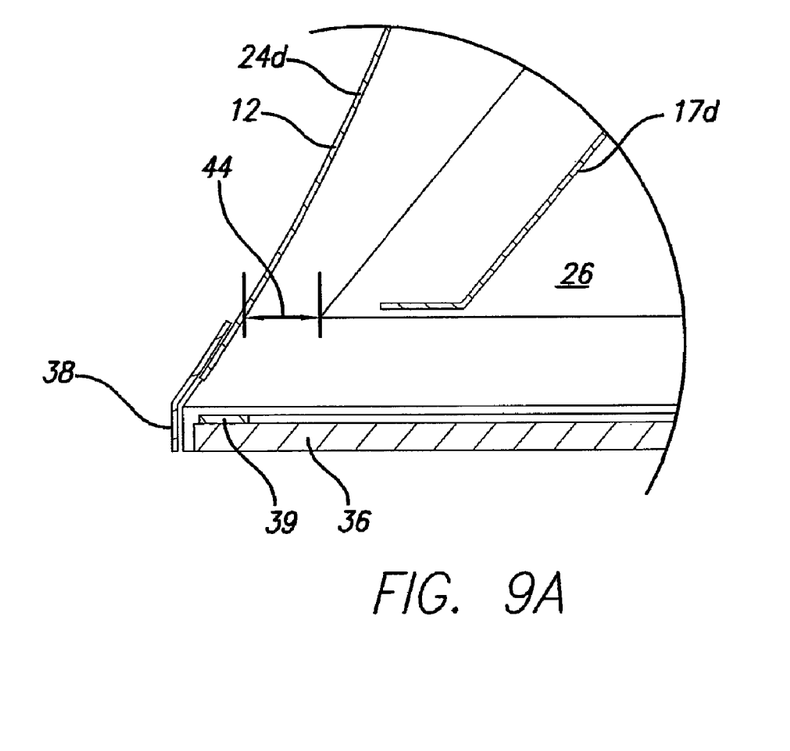
FIG. 9A is a detailed view showing a corner of the lighting apparatus.

In a preferred embodiment, air is pumped into outer housing 12 through intake vent 18 under pressure. The air passes through the first air path segment (also referred to herein as the first chamber) 42a, which, through a decrease in volume, causes an increase in air pressure. In other words, the cross-sectional area of the first chamber or first air path segment 42a decreases in the air flow direction. This decrease in volume is shown in FIG. 9 and terminates in an opening or nozzle 44 that is defined by the inner reflector 14 and side walls 24a, 24b and 24d of housing 12. Nozzle 44 is best shown in FIGS. 1 and 9A.

With the air at a higher pressure and as a result of the shape of nozzle 44, the air is released across cover 16 and through second air path segment 42b in a flat curtain form. Preferably, the air curtain covers a large portion of the surface area of cover 16 (and, more particularly, transparent portion 36). FIG. 1 shows a perspective view of the air flow through second air path segment 42b. It will be understood that for viewing purposes only cover 16 is removed from housing 12. However, in operation, to help define air path 42 (and, in particular, second air path segment 42b) cover 16 will be secured on housing 12.

Figure 9B:
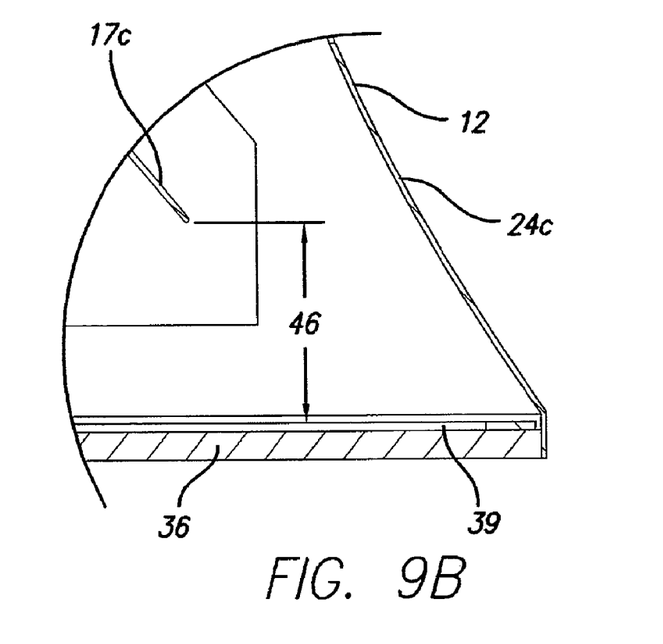
FIG. 9B is a detailed view showing a corner of the lighting apparatus.

It will be appreciated by those skilled in the art that as the air passes through second air path segment 42b it blocks a significant portion of the heat that is radiated from light bulb 21 before it has a chance to get to or through transparent portion 36. The heated air then exits the second air path segment 42b through an opening 46 defined by the reflector 14 and cover 16 and enters the third air path segment (also referred to herein as the second chamber) 42c. Opening 46 is best shown in FIGS. 1, 2 and 9B.

After the air passes through third air path segment 42c it exits through exhaust vent 20. In a preferred embodiment, nozzle 44 is smaller than opening 46, thereby allowing air pressure to decrease and allowing an exhaust fan (if used) to more easily suck the heated air our of housing 12. Furthermore, in a preferred embodiment, the third air path segment 42c increases in volume as the air moves through it, thereby decreasing pressure even further. In other words, the cross-sectional area of the second chamber or third air path segment 42a increases in the air flow direction, as is best shown in FIG. 9.

It will be understood that certain portions of the space between the inner reflector 14 and outer housing 12 are sealed off to allow the air to move through the air path 42 as described above. For example, in a preferred embodiment, a rib 48 is positioned between the inner reflector 14 and outer housing 12 as shown in FIG. 9 (the shape of rib 48 is best shown in FIG. 2). This forces air that enters through intake vent 42 to follow the desired path.

In an exemplary use of the present invention, the lighting apparatus 10 is hung, using hangers 25, in an indoor greenhouse at a position where it is spaced above a plurality of plants therein. Ducts 100 are attached to the intake and exhaust duct flanges 18a and 20a. In a preferred embodiment, each of the ducts includes a fan associated therewith. In operation, the light and each of the fans are turned on. The intake fan blows air into the intake vent 18, through the first air path segment 42a, where the air is spread out and pressurized and through nozzle 44. Meanwhile, the lightbulb is radiating heat. The air then enters second air path segment 42b in a flat curtain form. This rush of air across the cover 16 picks up the heat radiated by the bulb and whisks it away toward opening 46. The heated air then passes through opening 46 and into third air path segment 42c. The exhaust fan then pulls the heated air out of exhaust vent 20 and into the exhaust duct 100.

As discussed in the Background of the Invention section, it is advantageous to place a lighting apparatus close to the plants. In the present invention, because a significant portion of the heat radiated from the bulb is whisked away by the air curtain, the lighting apparatus can be placed close to the plants without damaging them. It will be understood that this is only an exemplary use of the lighting apparatus and it is not a limitation on the present invention.

The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. A lighting apparatus comprising:
    a) an outer housing defining an intake vent and an exhaust vent, wherein the outer housing includes a cover, a top and a plurality of side walls that define an interior,
    b) an inner housing disposed within the interior of the outer housing, wherein the inner housing includes a top and a plurality of side walls that correspond to the top and plurality of side walls of the outer housing, and
    c) an air path defined between the outer housing and the inner housing, wherein air entering the outer housing through the intake vent travels along the air path and exits the outer housing through the exhaust vent,
    wherein the top of the inner housing does not include any openings therein that allow air to flow therethrough, and wherein there is only one general path that the air can take when moving between the intake vent and the exhaust vent.

2. A lighting apparatus comprising:
    a) an outer housing defining an intake vent and an exhaust vent, wherein the outer housing includes a cover, a top and a plurality of side walls that define an interior,
    b) an inner housing disposed within the interior of the outer housing, wherein the inner housing includes a top and a plurality of side walls that correspond to the top and plurality of side walls of the outer housing, and
    c) an air path defined between the outer housing and the inner housing, wherein air entering the outer housing through the intake vent travels along the air path and exits the outer housing through the exhaust vent, wherein a first air path segment is defined between a first side wall of the outer housing and a corresponding first side wall of the inner housing, a second air segment is defined adjacent to the inside surface of the cover and a third air segment is defined between a second side wall of the outer housing and a corresponding second side wall of the inner housing, and wherein the air path is comprised of the first, second and third air paths,
    wherein the top of the inner housing does not include any openings therein that allow air to flow therethrough.

3. A lighting apparatus comprising:
    a) an outer housing defining an intake vent and an exhaust vent, wherein the outer housing includes a cover, a top and a plurality of side walls that define an interior, and wherein the intake and exhaust vents are defined in the top of the outer housing,
    b) an inner housing disposed within the interior of the outer housing, wherein the inner housing includes a top and a plurality of side walls that correspond to the top and plurality of side walls of the outer housing, and
    c) an air path defined between the outer housing and the inner housing, wherein air entering the outer housing through the intake vent travels along the air path and exits the outer housing through the exhaust vent,
    wherein the top of the inner housing does not include any openings therein that allow air to flow therethrough.

4. The lighting apparatus of claim 2 wherein the cross-sectional area of the first air path segment changes in an air flow direction.

5. The lighting apparatus of claim 2 wherein the cross-sectional area of the first air path segment decreases in an air flow direction.

6. The lighting apparatus of claim 4 wherein the cross-sectional area of the third air path segment changes in an air flow direction.

7. The lighting apparatus of claim 5 wherein the cross-sectional area of the third air path segment increases in an air flow direction.

8. The lighting apparatus of claim 2 wherein the first air path segment ends in a nozzle defined by a side wall of the inner housing and three side walls of the outer housing.

9. A method of minimizing heat emanating from a lighting apparatus, the method comprising the steps of:
    a) providing a lighting apparatus with an outer housing having a top, an inner housing having a top, a bulb and a cover, wherein the outer housing includes an intake vent and an exhaust vent defined therein,
    b) illuminating the bulb, thereby giving off heat, and
    c) moving air through the intake vent, through a first chamber defined between the inner and outer housings, across the inside surface of the cover, through a second chamber defined between the inner and outer housings and through the exhaust vent
    wherein air does not flow through the top of the inner housing.

10. The method of claim 9 wherein the top of the outer housing comprises a plurality of side walls depending therefrom, and wherein the top of the inner housing comprises a plurality of side walls depending therefrom.

11. The method of claim 10, wherein the first chamber is defined at least partially between a first side wall of the outer housing and a first side wall of the inner housing, and wherein the second chamber is defined at least partially between a second side wall of the outer housing and a second side wall of the inner housing.

12. The method of claim 9 wherein as the air moves through the first chamber, the air pressure increases.

13. The method of claim 12 wherein as the air moves through the second chamber, the air pressure decreases.

14. The method of claim 9 wherein the cross-sectional area of the first chamber decreases in an air flow direction.

15. The method of claim 14 wherein the cross-sectional area of the second chamber increases in an air flow direction.

16. A lighting apparatus comprising:
   a) an outer housing defining an intake vent and an exhaust vent, wherein the outer housing includes a cover, a top and a plurality of side walls that define an interior,
   b) an inner housing disposed within the interior of the outer housing, wherein the inner housing includes a top and a plurality of side walls that correspond to the top and plurality of side walls of the outer housing,
   c) an air path defined between the outer housing and the inner housing, wherein air entering the outer housing through the intake vent travels along the air path and exits the outer housing through the exhaust vent, and
   d) a fan, wherein the fan blows air through the intake vent,
   wherein the top of the inner housing does not include any openings therein that allow air to flow therethrough.

* * * * *